(12) United States Patent  
Gerstenberger et al.

(10) Patent No.: US 8,730,888 B2  
(45) Date of Patent: May 20, 2014

(54) HANDLING DISCONTINUOUS TRANSMISSION INDICATION BITS

(75) Inventors: Dirk Gerstenberger, Stockholm (SE); Lars Lindbom, Karlstad (SE)

(73) Assignee: Sharp Kabushiki Kaisha, Osaka-shi, Oska (JP)

( * ) Notice: Subject to any disclaimer, the term of this patent is extended or adjusted under 35 U.S.C. 154(b) by 429 days.

(21) Appl. No.: 13/124,912

(22) PCT Filed: Oct. 5, 2009

(86) PCT No.: PCT/SE2009/051100  
§ 371 (c)(1),  
(2), (4) Date: Apr. 19, 2011

(87) PCT Pub. No.: WO2010/071546  
PCT Pub. Date: Jun. 24, 2010

(65) Prior Publication Data  
US 2011/0211520 A1 Sep. 1, 2011

Related U.S. Application Data

(60) Provisional application No. 61/138,205, filed on Dec. 17, 2008.

(51) Int. Cl.  
*H04W 4/00* (2009.01)

(52) U.S. Cl.  
USPC .......................................... 370/329; 370/341

(58) Field of Classification Search  
None  
See application file for complete search history.

(56) References Cited

U.S. PATENT DOCUMENTS

| | | | | |
|---|---|---|---|---|
| 2004/0086033 | A1* | 5/2004 | Hong | 375/222 |
| 2008/0101326 | A1* | 5/2008 | Zhang et al. | 370/345 |
| 2009/0129317 | A1* | 5/2009 | Che et al. | 370/328 |

FOREIGN PATENT DOCUMENTS

| | | |
|---|---|---|
| EP | 1 271 874 | 1/2003 |
| JP | 2003-37644 | 2/2003 |

OTHER PUBLICATIONS

International Search Report for PCT/SE2009/051100, mailed Mar. 1, 2010.  
Written Opinion of the International Searching Authority for PCT/SE2009/051100, mailed Mar. 1, 2010.  
International Preliminary Report on Patentability for PCT/SE2008/051100, dated Sep. 30, 2010, with 3 Amended sheets.  
Bergman et al, "HSPA Evolution—Boosting the Performance of Mobile Broadband Access", Ericsson Review No. 1, 2008, pp. 32-37.  
RP-081124, 3GPP TSG-RAN Meeting #42, "3.84 Mcps TDD MBSFN Integrated Mobile Broadcase", Ahtens Greece, Dec. 2-5, 2008.  
3GPP TS 25,212 V8.5.0, Technical Specification, $3^{rd}$ Generation Partnership Project; Technical Specification Group Radio Access Network; Multiplexing and Channel Coding (FDD) (Release 8), Mar. 2009.  
English translation of the Chinese Office Action mailed May 14, 2013 in Chinese Application 200980150765.0.

* cited by examiner

*Primary Examiner* — Marcus R Smith  
(74) *Attorney, Agent, or Firm* — Nixon & Vanderhye, P.C.

(57) ABSTRACT

Transmitter(s) (34), radio base station nodes (38) comprising transmitter(s), and methods of operating transmitter(s)/radio base station(s) involve handling discontinuous transmission indication bits, particularly when transmitting using a 16 QAM signal point constellation having an I-branch and a Q-branch (for a quadruple of bits comprising two I-branch bits, i1 and i2, and two Q-branch bits q1 and q2). The transmitter(s) (34) and the radio base station nodes (28) comprised thereof are operated to perform a Multimedia Broadcast Multicast Service over Single Frequency Network (MBSFN) transmission wherein the MBSFN transmission comprises mapping data to a Secondary Common Control Physical Channel (SCCPCH).

5 Claims, 8 Drawing Sheets

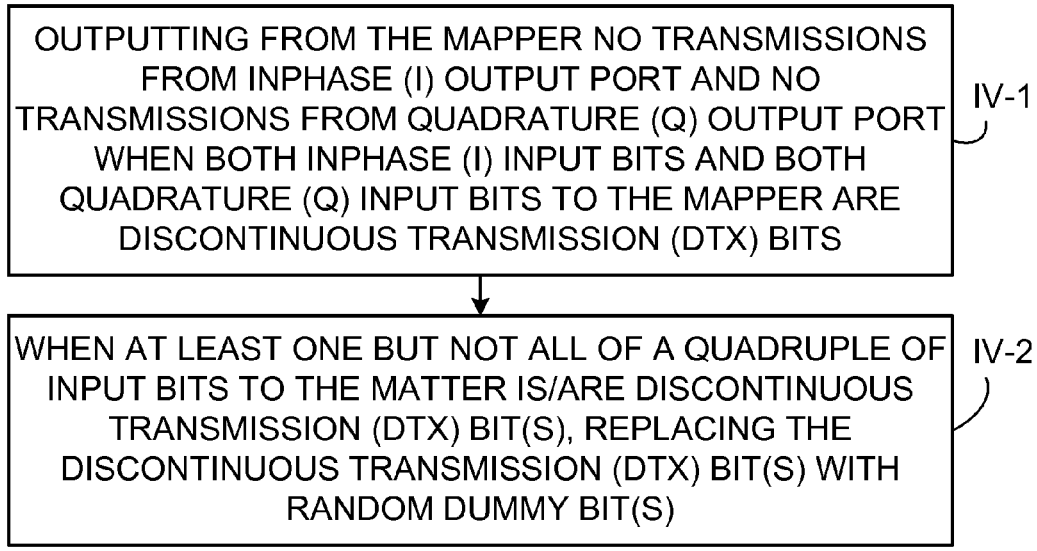
Fig. 9
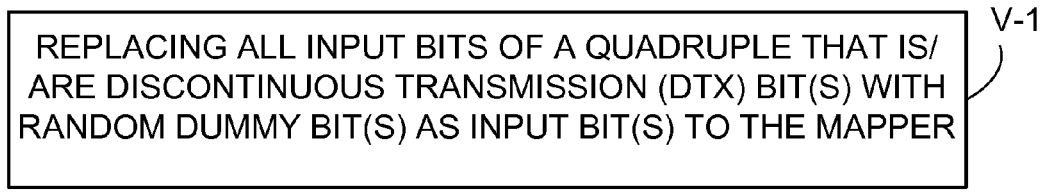
Fig. 10
| RANDOM DUMMY BIT SELECTION FACTORS | |
|---|---|
| SELECTED TO MAINTAIN UNBIASED AVERAGE POWER OF A 16 QAM SIGNAL POINT CONSTELLATION OF THE MAPPER | SELECTED IN COORDINATION WITH OTHER RADIO BASE STATION NODES ALSO PARTICIPATING IN THE MULTIMEDIA BROADCAST MULTICAST SERVICE OVER SINGLE FREQUENCY NETWORK (MBSFN) TRANSMISSION |
| 11-1 | 11-2 |
Fig. 11

HANDLING DISCONTINUOUS TRANSMISSION INDICATION BITS

This application is the U.S. national phase of International Application No. PCT/SE2009/051100, filed 5 Oct. 2009, which designated the U.S., and claims the benefit of U.S. Provisional Application No. 61/138,205, filed 17 Dec. 2008, the entire contents of each of which are hereby incorporated by reference.

This application claims the priority and benefit of U.S. Provisional patent application 61/138,205, filed Dec. 17, 2008, entitled "Methods For Handling DTX Bits In Connection with 16QAM", which is incorporated herein by reference in its entirety.

TECHNICAL FIELD

This invention pertains to telecommunications, and particularly to baseband processing methods and apparatus in a transmitter for handling discontinuous transmission indication bits when transmitting using a 16 QAM signal point constellation.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks is also called "NodeB". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity.

Multimedia Broadcast Multicast Service (MBMS) is a broadcasting service that can be offered via existing GSM and UMTS cellular networks. MBMS uses multicast distribution in the core network instead of point-to-point links for each end device. MBMS enables cellular networks to distribute, by shared broadcasts, multimedia in a digital form, sent out simultaneously to all cell phone users within each transmitter footprint by a single shared transmission. MBMS has been standardized in various groups of 3GPP, and the first phase standards are found in UMTS release 6.

MBMS over single frequency networks (MBSFN) has recently been specified in 3GPP for Release-7 UTRA systems. MBSFN Release 7 has further optimized MBMS to boost transmission efficiency beyond what could be achieved with multicell MBMS transmission in Release 6. Multicast/broadcast single-frequency network (MBSFN) operation involves for simultaneous transmission of the exact same waveform from multiple cells. In this way the wireless terminal (UE) receiver perceives the multiple MBSFN cells as one large cell. Also, instead of inter-cell interference from neighboring cell transmissions, the wireless terminal experiences constructive superposition of the signals transmitted from multiple MBSFN cells. Advanced UE receiver techniques such as G-RAKE eliminate intra-cell interference by resolving the time difference of multipath propagation. The result is highly efficient radio broadcast transmission derived from WCDMA technology. An enhancement that eliminates inter-cell interference is the use of a common scrambling code on downlink carriers reserved for MBSFN transmission. Broadcast data is transmitted using the same logical and physical channel structures as for MBMS—that is, MTCH and S-CCPCH, along with control channels such as MCCH, MICH and MSCH. MBSFN improves power efficiency so much that the limiting factor in the radio downlink is no longer power but rather codes. 16 QAM modulation has been introduced for MBSFN to make good use of available radio resources. To significantly reduce battery consumption in UEs, one may even multiplex services per transmission time interval (TTI). See, e.g., Bergman, Johan, et al., "HSPA Evolution—Boosting the Performance of Mobile Broadband Access", Ericsson Review No. 1, 2008, pg. 32-37.

MBSFN thus provides significantly higher spectral efficiency compared to Release-6 MBMS and is primarily intended for broadcasting high bit rate demanding Mobile TV services on dedicated MBMS carriers. Since broadcast only, MBSFN inherently target transmissions in unpaired frequency bands.

In single frequency network (SFN) transmissions, multiple base stations transmit the same waveform at the same time such that a terminal receives all base stations as if it were one large cell. For UTRA systems, SFN transmission implies that a cluster of time synchronized NodeBs transmit same contents using same channelization and scrambling codes. SFN transmission is illustrated in FIG. 1, where a terminal receives from two base stations. When using cell-specific scrambling, transmissions from the right hand side base station would represent inter-cell interference for the terminal in the adjacent cell. In a single frequency network, however, inter-cell interference become visible as additional multipath which can be taken into account by the terminal receiver as desired signal, resulting in considerable improved coverage.

MBSFN enhances the Release-6 MBMS physical layers by supporting SFN operations for MBMS point-to-multipoint (ptm) transmissions on a dedicated MBMS carrier. It also supports higher service bit rates and efficient time division multiplexing of services for reducing terminal battery consumptions by allowing discontinuous reception (DRX) of services. MBSFN use the same type of channels as used for Release-6 MBMS ptm transmissions.

In order to provide smooth integration of the MBSFN feature to any existing UTRA system, MBSFN has been specified for both FDD and TDD based physical layer downlink (DL) channel structures and thus encompasses MBSFN based on WCDMA (FDD); MBSFN based on TD-SCDMA (TDD); and MBSFN based on TD-CDMA (TDD). The FDD related MBSFN uses the WCDMA DL physical layer channels for transmission of data, and no paired uplink transmissions occur. In the TDD related MBSFN, all slots are used for downlink transmissions when networks are optimized for broadcast. Hence, no duplex occurs in MBSFN and the differences between FDD and TDD based MBSFN then mainly refer to the physical layer slot formats, the way Mobile TV services are time multiplexed and the chip rates in the case of the TDD options TD-SCMA and 7.68 Mcps TD-CDMA. (The chip rate for the third TDD option, 3.84 Mcps TD-CDMA, is the same as used in FDD.)

When transmitting in all downlink slots only, the meaning of TDD and FDD becomes obsolete in the sense that no duplex occurs in broadcast. As mentioned above, the difference then basically refers to the construction of the downlink physical channels. Therefore document RP-081124, Work item description of 3.84 Mcps TDD MBSFN Integrated Mobile Broadcast (incorporated herein by reference), specifies the WCDMA based MBSFN approach as a fourth TDD option in which all slots are dedicated for broadcast. This fourth TDD option has been referred to as MBSFN Integrated Mobile Broadcast (IMB) and has been targeted for 3GPP Release-8 UTRA systems. The MBSFN IMB fulfils relevant TDD RF requirements.

Digital modulation schemes are employed to determine how bits are mapped to the phase and amplitude of transmitted signals. Each consecutive bit sequence is mapped to a modulation symbol whose phase and amplitude correspond to one of the plural possible constellation points. For different modulation schemes the number of bits conveyed per modulation symbol is as follows: 1 for BPSK, 2 for QPSK, 4 for 16QAM, and 6 for 64QAM. Therefore, higher modulation order means greater achievable peak data bit rate for a given symbol rate. HSPA (3GPP Release 6) supports the QPSK and 16QAM modulation schemes in the downlink and the BPSK and QPSK modulation schemes in the uplink. Both MBSFN Release 7 and MBSFN IMB introduce higher-order modulations that increase the spectral efficiency.

The MBSFN Integrated Mobile Broadcast (IMB) transport channel baseband processing has the possibility to also map data on the Secondary Common Control Physical Channel (S-CCPCH) using an 16QAM signal point constellation, in addition to the ordinary QPSK. In contrast to HSDPA using 16QAM, discontinuous transmission (DTX) indication bits (alternatively referred to as discontinuous transmission (DTX) bits or DTX bits below) are used to fill up the S-CCPCH radio frames, as described in 3GPP TS25.212 "Multiplexing and channel coding (FDD)" v8.3.0, incorporated by reference herein.

In the case of QPSK, two bits $(i_1,q_1)$ are mapped to one of four symbols as illustrated in FIG. 2. In the QPSK mapping of FIG. 2 the letter "A" represents the amplitude of the signals transmitted on the I and Q branches. When one of the bits is a DTX bit, only one of the I and Q signals is transmitted, or when both $(i_1,q_1)$ are DTX bits no signals are transmitted.

FIG. 3 represents a case of 16QAM modulation wherein the quadruple $(i_1,q_1, i_2,q_2)$ is to be mapped to one of 16 symbols. In FIG. 3 the notations "A1" and "A2" represent the possible amplitudes of the signals transmitted on the I and Q branches. For the 16QAM mapping of FIG. 3 the amplitude levels correspond to A1=0.4472 and A2=1.3416, as understood from 3GPP TS25.213 "Spreading and modulation (FDD)" v.8.2.0, which is incorporated herein by reference.

In contrast to the case of QPSK, the 16 QAM mapping of the four bits where one or several bits are DTX bits may not be well defined. For example, the quadruple (1,x,1,1) could be interpreted that the Q branch transmit a signal with the amplitude A2 (x=0) or −A2 (x=1). Thus, with DTX bits there is no one-to-one mapping between bits and symbols of a 16QAM signal point constellation. This makes expression of a discontinuous transmission (DTX) bit problematic for 16 QAM modulation. Table 1 shows possible combinations of discontinuous transmission (DTX) bits in a quadruple of four bits ("X" denoting the DTX bit and "B" denoting a non-DTX bit).

TABLE 1

Combinations of DTX bits in a quadruple of 4 bits

| | $i_1$ | $i_2$ | $q_1$ | $q_2$ |
|---|---|---|---|---|
| 1 | X | X | X | X |
| 2 | B | X | X | X |
| 3 | X | B | X | X |
| 4 | X | X | B | X |
| 5 | X | X | X | B |
| 6 | B | B | X | X |
| 7 | B | X | B | X |
| 8 | X | B | B | X |
| 9 | B | X | X | B |
| 10 | X | B | X | B |
| 11 | X | X | B | B |
| 12 | B | B | B | X |
| 13 | B | B | X | B |
| 14 | B | X | B | B |
| 15 | X | B | B | B |

SUMMARY

In one of its aspects the technology disclosed herein concerns transmitter(s) and methods of operating transmitter(s) for handling discontinuous transmission bits (DTX bits), particularly when transmitting using a 16 QAM signal point constellation having an I-branch and a Q-branch (for a quadruple of bits comprising two I-branch bits, i1 and i2, and two Q-branch bits q1 and q2). The method comprises (II-1) performing no transmissions on both I and Q branches when both I-branch bits i1 and i2 and both Q-branch bits q1 and q2 are DTX bits; (II-2) if both I-branch bits i1 and i2 are DTX bits and there is no DTX bit among the Q-branch bits q1 and q2, then repeating the Q-branch bits on the I-branch; (II-3) if both Q-branch bits q1 and q2 are DTX bits and there is no DTX bit among the I-branch bits i1 and i2, then repeating the I-branch bits on the Q-branch; (II-4) if there are three DTX bits and a non-DTX bit in the quadruple of bits, replacing the three DTX bits with the non-DTX bit; (II-5) if there is a single DTX-bit in the I-branch bits, replacing the I-branch DTX-bit with the non-DTX bit of the I-branch; and (II-6) if there is a single DTX-bit in the Q-branch bits, replacing the Q-branch DTX-bit with the non-DTX bit of the Q-branch.

In correlative fashion the technology disclosed herein also concerns a transmitter configured to handle discontinuous transmission indication bits (DTX bits) when transmitting using a 16 QAM signal point constellation having an I-Branch and a Q-branch. The transmitter comprises baseband processing means adapted, for a quadruple of bits comprising two I-branch bits, i1 and i2, and two Q-branch bits q1 and q2, to perform acts such as aforementioned acts (II-1) through (II-6).

In another of its aspects the technology disclosed herein methods of operating a radio base station node comprise performing a Multimedia Broadcast Multicast Service over Single Frequency Network (MBSFN) transmission wherein the MBSFN transmission comprises mapping data to a Secondary Common Control Physical Channel (S-CCPCH). For the Secondary Common Control Physical Channel (S-CCPCH) the methods include operating a 16 Quadrature Amplitude Modulation (QAM) mapper according to a predetermined strategy. The predetermined strategy is configured whereby one or more discontinuous transmission (DTX) bits input to the mapper result in unambiguous determination of output values from an Inphase (I) output and a Quadrature (Q) output of the mapper.

The predetermined strategy can take various embodiments and modes. In a first example embodiment and mode the predetermined strategy comprises (I-1) outputting from the mapper no transmissions from the Inphase (I) output when both Inphase (I) input bits to the mapper are discontinuous transmission (DTX) bits; (I-2) outputting from the mapper no transmissions from the Quadrature (Q) output when both Quadrature (Q) input bits to the mapper are discontinuous transmission (DTX) bits; (I-3) when only one of the Inphase (I) input bits to the mapper is a discontinuous transmission (DTX) bit, replacing the discontinuous transmission (DTX) bit with a random bit; and (I-4) when only one of the Quadrature (Q) input bits to the mapper is a discontinuous transmission (DTX) bit, replacing the discontinuous transmission (DTX) bit with a random bit. Preferably the random dummy bit is selected to maintain unbiased average power of a 16 QAM signal point constellation of the mapper.

In a second example embodiment and mode the predetermined strategy comprises (II-1) outputting from the mapper no transmissions from Inphase (I) and Quadrature (Q) output when both Inphase (I) input bits $i_1$ and $i_2$ to the mapper and both Quadrature (Q) input bits $q_1$ and $q_2$ to the mapper are discontinuous transmission (DTX) bits; (II-2) when both of the Inphase (I) input bits $i_1$ and $i_2$ to the mapper are discontinuous transmission (DTX) bits and neither of the Quadrature (Q) input bits are discontinuous transmission (DTX) bits, replacing the first and second input Inphase (I) discontinuous transmission (DTX) bits $i_1$ and $i_2$ with the respective first and second Quadrature (Q) input bits; (II-3) when both of the Quadrature (Q) input bits $q_1$ and $q_2$ to the mapper are discontinuous transmission (DTX) bits and neither of the Inphase (I) input bits i1 and i2 are discontinuous transmission (DTX) bits, replacing first and second input Quadrature (Q) discontinuous transmission (DTX) bits $q_1$ and $q_2$ with respective first and second Inphase (I) input bits $i_1$ and $i_2$; (II-4) when there are three discontinuous transmission (DTX) bits and a non-discontinuous transmission (DTX) bit in a quadruple of input bits input to the mapper replacing the three discontinuous transmission (DTX) bits with the non-discontinuous transmission (DTX) bit; (II-5) when only one of the Inphase (I) input bits to the mapper is a discontinuous transmission (DTX) bit, replacing the discontinuous transmission (DTX) bit with a paired non-discontinuous transmission (DTX) Inphase (I) input bit; (II-6) when only one of the Quadrature (Q) input bits to the mapper is a discontinuous transmission (DTX) bit, replacing the discontinuous transmission (DTX) bit with a paired non-discontinuous transmission (DTX) Quadrature (Q) input bit.

In a third example embodiment and mode wherein the 16 Quadrature Amplitude Modulation (QAM) mapper is configured to employ a 16 QAM signal point constellation of symbols, each symbol of the constellation having one amplitude from a set of amplitudes {A2, A1, −A1, −A2}, and wherein the predetermined strategy comprises: (III-1) outputting from the mapper no transmissions from Inphase (I) and Quadrature (Q) output when both Inphase (I) input bits $i_1$ and $i_2$ to the mapper and/or both Quadrature (Q) input bits $q_1$ and $q_2$ to the mapper are discontinuous transmission (DTX) bits; (III-2) when only one of the Inphase (I) input bits to the mapper is a discontinuous transmission (DTX) bit, replacing the discontinuous transmission (DTX) bit with a dummy bit in accordance with Table C; (III-3) when only one of the Quadrature (Q) input bits to the mapper is a discontinuous transmission (DTX) bit, replacing the discontinuous transmission (DTX) bit with a dummy bit in accordance with a predetermined Table.

In a fourth example embodiment and mode the predetermined strategy comprises (IV-1) outputting from the mapper no transmissions from Inphase (I) output and no transmissions from Quadrature (Q) output when both Inphase (I) input bits and both Quadrature (Q) input bits to the mapper are discontinuous transmission (DTX) bits; (IV-2) when at least one but not all of a quadruple of input bits to the matter is/are discontinuous transmission (DTX) bit(s), replacing the discontinuous transmission (DTX) bit(s) with random dummy bit(s).

In a fifth example embodiment and mode the predetermined strategy comprises (V-1) replacing all input bits of a quadruple that is/are discontinuous transmission (DTX) bit(s) with random dummy bit(s) as input bit(s) to the mapper.

For the first, fourth, and fifth example embodiments and modes the random dummy bit(s) are preferably selected in coordination with other radio base station nodes also participating in the Multimedia Broadcast Multicast Service over Single Frequency Network (MBSFN) transmission.

For the first, fourth, and fifth example embodiments and modes the random dummy bit(s) are preferably selected to maintain unbiased average power of a 16 QAM signal point constellation of the mapper.

In another of its aspects the technology disclosed herein disclosed herein concerns radio base station nodes. The radio base station nodes comprise a transmitter configured to provide a Multimedia Broadcast Multicast Service over Single Frequency Network (MBSFN) transmission over an air interface to a wireless terminal and a 16 Quadrature Amplitude Modulation (QAM) mapper. The 16 Quadrature Amplitude Modulation (QAM) mapper is configured to map data to a Secondary Common Control Physical Channel (S-CCPCH) according to a predetermined strategy whereby one or more discontinuous transmission (DTX) bits input to the mapper result in unambiguous determination of output values from an Inphase (I) output and a Quadrature (Q) output of the mapper. The predetermined strategy can be, for example, any one or more of the aforementioned example embodiments and modes.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 9 is a flowchart illustrating basic, representative acts or steps comprising a fourth example embodiment and mode of a predetermined strategy of operating a mapper of a transmission formatter.

FIG. 10 is a flowchart illustrating basic, representative acts or steps comprising a fifth example embodiment and mode of a predetermined strategy of operating a mapper of a transmission formatter.

FIG. 11 is a diagram illustrating examples of factors which may influence selection of random dummy bits.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Figure 4A:
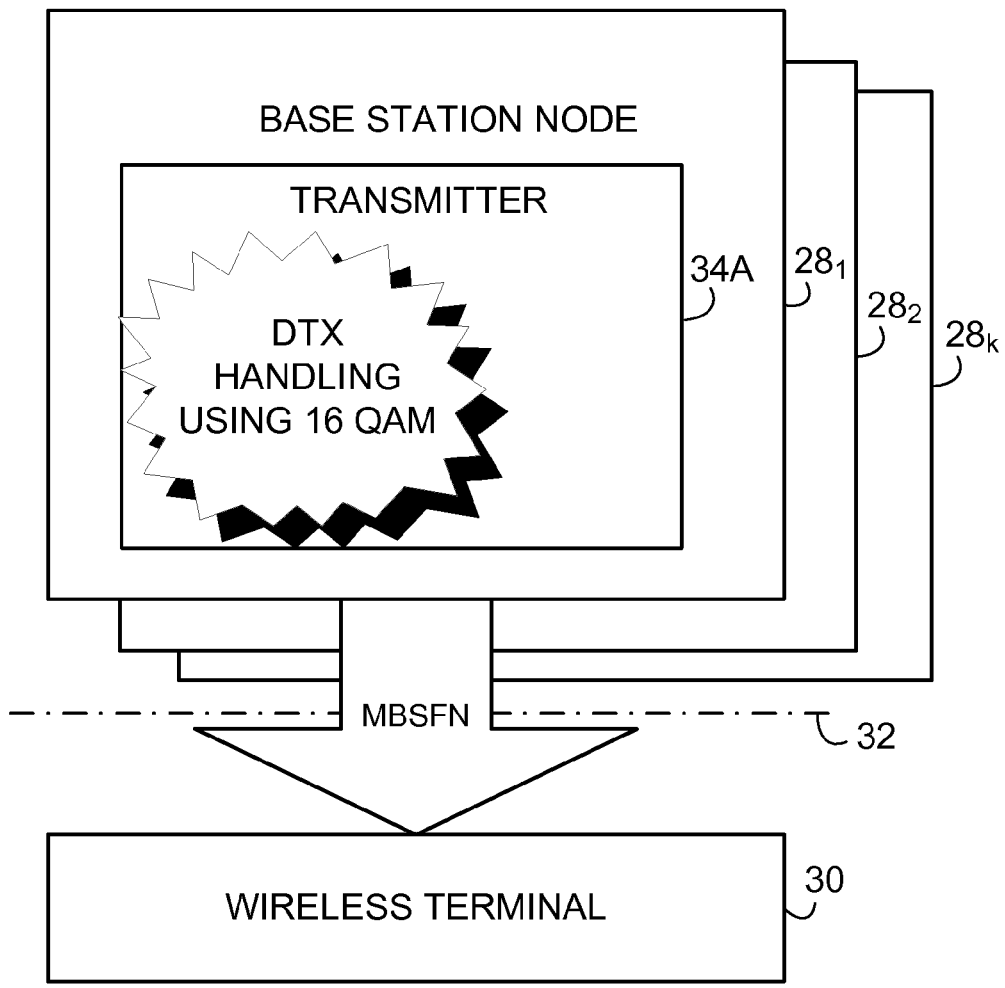
FIG. 4A is a schematic view of a base station node suited for Multimedia Broadcast Multicast Service transmissions to a wireless terminal in a Single Frequency Network context.

FIG. 4A shows plural radio base station nodes $28_1$-$28_k$ (also known as, e.g., NodeBs) which participate in Multimedia Broadcast Multicast Service transmissions to a wireless terminal 30 in a Single Frequency Network context. One or more of the plural radio base station nodes $28_1$-$28_k$ communicate with the wireless terminal 30 over air interface 32. By way of representative example for the plural radio base station nodes $28_1$-$28_k$, base station node $28_1$ is shown as comprising transmitter 34A. As depicted in FIG. 4A, transmitter 34A is configured to handle discontinuous transmission (DTX) bits when transmitting using a 16 QAM signal point constellation. The transmitter 34A is particularly configured to handle discontinuous transmission (DTX) bits when transmitting using a 16 QAM signal point constellation in accordance with one or more of the predetermined strategies hereinafter described with reference to respective embodiments and modes depicted by FIG. 6-FIG. 11. A transmitter such as transmitter 34A of FIG. 4A can, but is not constrained to be, a type of transmitter such as transmitter 34B described in FIG. 4B and FIG. 5.

Figure 4B:
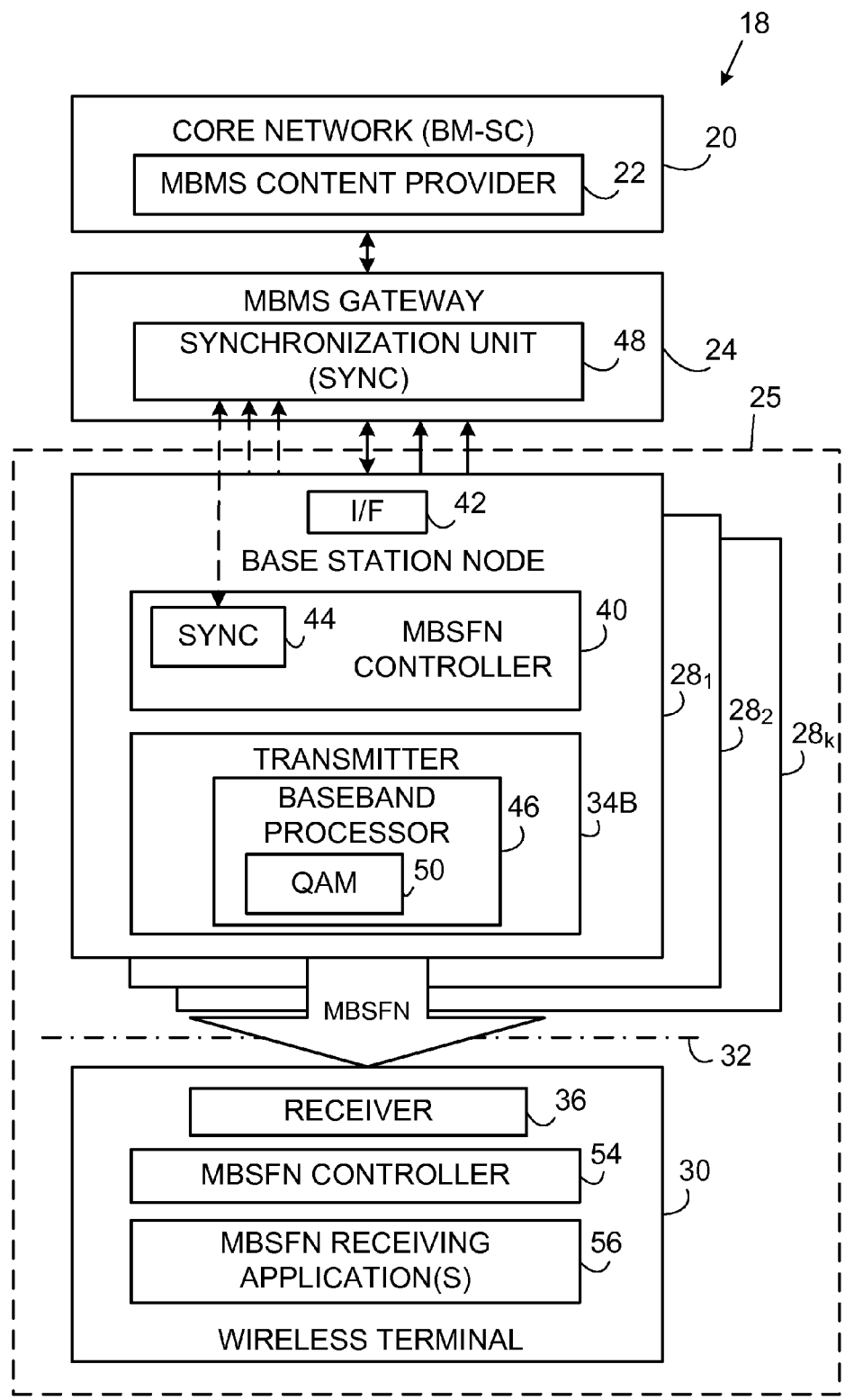
FIG. 4B is a schematic view of an example telecommunications network suited for Multimedia Broadcast Multicast Service transmissions in a Single Frequency Network context.

FIG. 4B illustrates an example telecommunications network 18 suited for Multimedia Broadcast Multicast Service (MBMS) transmissions in a Single Frequency Network context. FIG. 4B particular shows core network 20 which comprises or interfaces with MBMS content provider 22. The MBMS content provider 22 can take the example form of a MBMS server or server system. MBMS content from MBMS content provider 22 is transmitted through MBMS gateway 24 to radio access network 25. The radio access network 25 comprises plural radio base station nodes $28_1$-$28_k$ (also known as, e.g., NodeBs) and one or more wireless terminals. For sake of simplicity only one wireless terminal 30 is shown in FIG. 4B.

The wireless terminal 30 communicates with radio base station(s) 28 over a radio or air interface 32. To this each end radio base station 28 comprises base station transmitter 34B and wireless terminal 30 comprises UE receiver 36. The base station transmitter 34B and UE receiver 36 may comprise plural transmission elements (e.g., plural antenna), and may comprise one or more transceivers.

For the purposes of the present description base station transmitter 34A and transmitter 34B are designated as a "transmitter" and the UE receiver 36 is designated as a "receiver" in view of the fact that aspects of the Multimedia Broadcast Multicast Service (MBMS) described herein primarily involve downlink transmissions, e.g., transmissions from radio base station 26 to wireless terminal 30. It should be understood however that these elements may be combined with other elements that facilitate unicast communication over air interface 32.

The wireless terminal 30, alternatively referred to as a mobile station or user equipment unit (UE), may e.g. be a mobile telephone ("cellular" telephone) or a laptop with wireless/cellular capability. The wireless terminal 30 receives MBMS/MBSFN transmission from one or more of the radio base station(s). The wireless terminal may optionally in parallel also be involved in unicast communication with one or more radio base station(s) 28, e.g. radio base station $28_1$.

For sake of simplicity, the illustrated radio base station $28_1$ is referenced in representative manner herein as radio base station 28 (without subscript), and as such is exemplary of structure and operation of other radio base stations comprising radio access network 25. Such radio base station 28 comprises base station MBSFN controller 40. The base station MBSFN controller 40, as well as other units and functionalities of radio base station 28, communicate through interface 42 with MBMS gateway 24 and thus with core network 20.

The base station MBSFN controller 40 comprises, among other units and functionalities, synchronization unit 44. The synchronization unit 44 of base station MBSFN controller 40 communicates (via interface 42) with a corresponding master synchronization unit 48 of MBMS gateway 24. In Multimedia Broadcast Multicast Service (MBMS) the transmissions from the plurality of radio base stations $28_1$-$28_k$ must be synchronized, and such synchronization is implemented by master synchronization unit 48 being connected to a synchronization unit 44 of each radio base station.

In the particular example radio base station 28 of FIG. 4B, transmitter 34B comprises baseband processor 46. The baseband processor 46 is configured to prepare, e.g., format data and signals, for plural channels involved in the Multimedia Broadcast Multicast Service (MBMS). As mentioned above, Multimedia Broadcast Multicast Service (MBMS) utilizes plural channels, including MTCH (MBMS Traffic Channel), FACH (Forward Access Channel), and S-CCPCH (Secondary Common Control Physical Channel (S-CCPCH)). To format/prepare one or more such channels the baseband processor 46 comprises 16 Quadrature Amplitude modulation means or modulator (QAM), which is simply referred to herein as QAM 50. As explained herein after, QAM 50 is configured to map data to a Secondary Common Control Physical Channel (S-CCPCH) according to a predetermined strategy whereby one or more discontinuous transmission (DTX) bits input to the mapper result in unambiguous determination of Inphase (I) and Quadrature (Q) output values of the mapper.

Before describing transmitter 34B in more detail, reference is again made to FIG. 4B as showing that, for a non-limiting example implementation, wireless terminal 30 comprises, e.g., UE MBSFN controller 54 and MBSFN receiving applications 56. The UE MBSFN controller 54 serves, e.g., to process the data and signals received on downlink transmissions of the Multimedia Broadcast Multicast Service (MBMS). The MBSFN receiving applications 56 serve to display or utilize the received data and thus to depict the actual MBMS content intended to be supplied by MBMS content provider 22.

Figure 1:
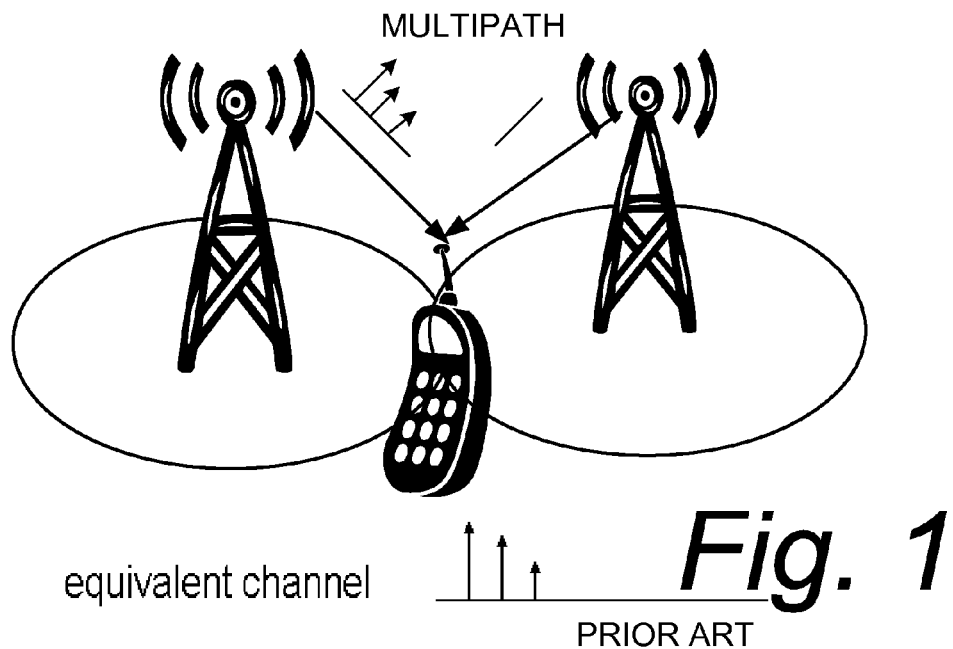
FIG. 1 is a diagrammatic view illustrating multipath transmissions in a Multimedia Broadcast Multicast Service Single Frequency Network.
Figure 2:
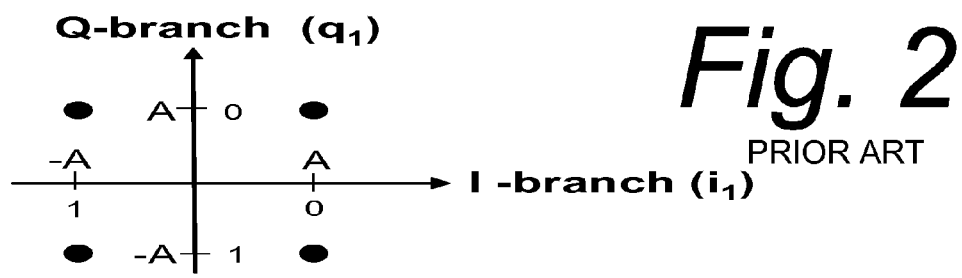
FIG. 2 is a diagrammatic view illustrating a QPSK modulation mapping of two bits to one of four symbols.
Figure 3:
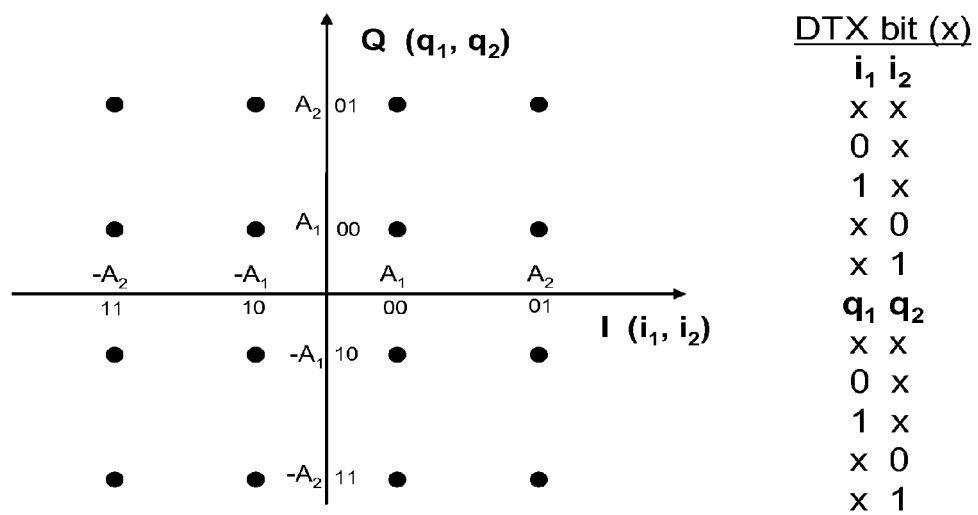
FIG. 3 is a diagrammatic view illustrating 16 QAM modulation mapping of four bits to one of sixteen symbols.
Figure 5:
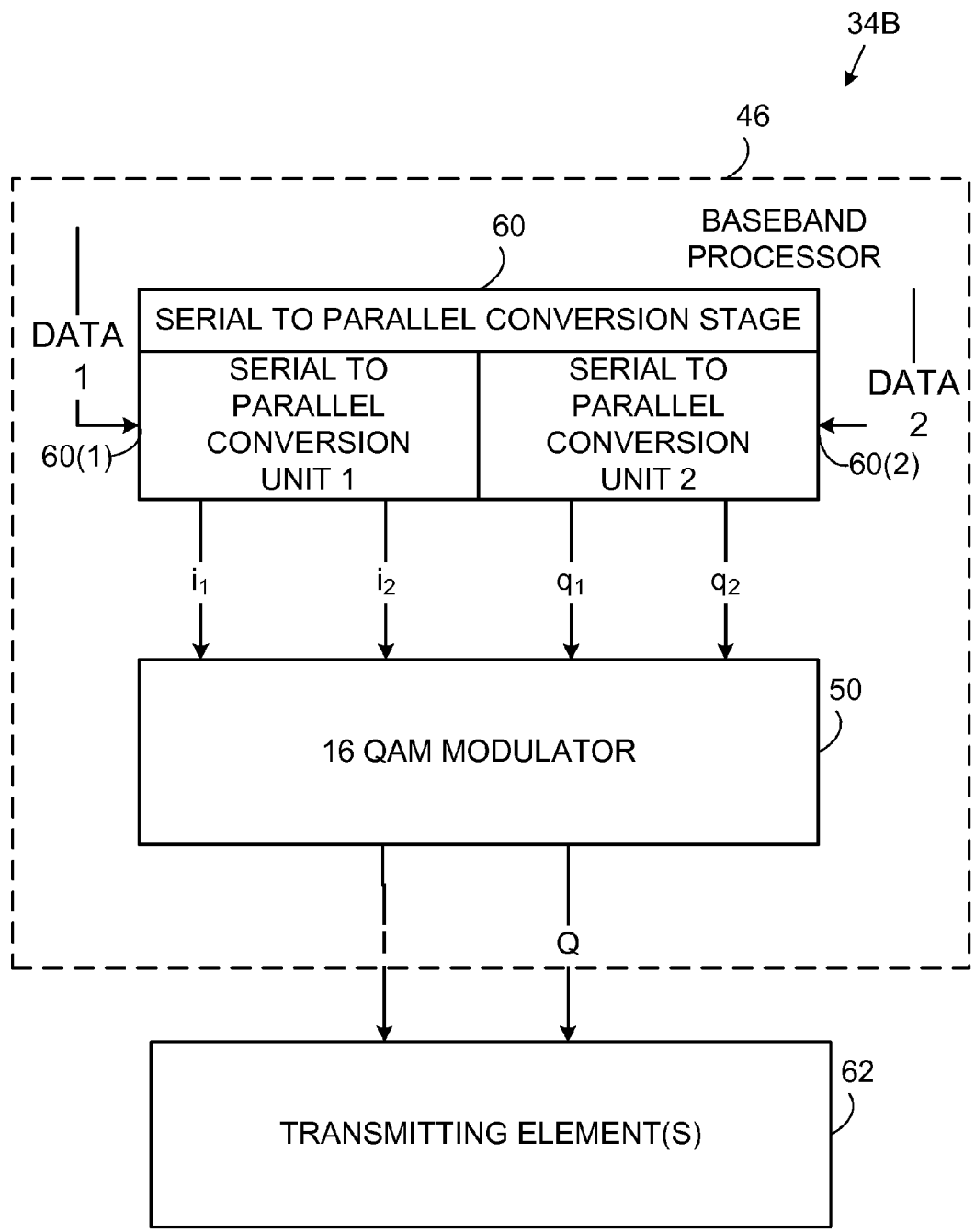
FIG. 5 is a schematic view of example portions of a radio base station node including an example transmission formatter.

An example embodiment of transmitter 34B of FIG. 4B is shown in FIG. 5. As mentioned above, the baseband processor 46 can format/prepare plural channels, and can do so using the constituent example units and/or functionalities shown in FIG. 5. The baseband processor 46 comprises serial-to-parallel conversion stage 60 (comprising serial-to-parallel conversion first unit 60(1) and serial-to-parallel conversion second unit 60(2)) and QAM 50. The serial-to-parallel conversion first unit 60(1) receives and serial-to-parallel converts a first data stream; serial-to-parallel conversion second unit 60(2) receives and serial-to-parallel converts a second data stream. The serial-to-parallel conversion stage 60 outputs four inputs (e.g., at/to respective input ports in an example hardware implementation) to QAM 50, i.e., Inphase (I) input bits $i_1$ and $i_2$ (from serial-to-parallel conversion first unit 60(1)) and Quadrature (Q) input bits $q_1$ and $q_2$ (from serial-to-parallel conversion second unit 60(2)). In similar manner as shown in FIG. 3, QAM 50 is configured to employ a 16 QAM signal point constellation of symbols, each symbol of the constellation having one amplitude from a set of amplitudes {A2, A1, −A1, −A2}. In accordance with its four input bits (known as quadruple), QAM 50 applies a signal or value at its Inphase (I) output and its Quadrature (Q) output. In a non-limiting implementation (such as a hardware implementation, for example), the Inphase (I) output and its Quadrature (Q) output can be a respective Inphase (I) output port and a respective Quadrature (Q) output port. The paired values from the Inphase (I) output and the Quadrature (Q) output of QAM 50 are applied to transmitting element(s) 62. The transmitting element(s) 62 can comprise, e.g., other modulators, amplifiers, other signal conditioning elements, and antenna(s), for example.

As indicated above, the transmitter 34A of FIG. 4A and transmitter 34B of FIG. 4B are configured to map data to a Secondary Common Control Physical Channel (S-CCPCH) according to a predetermined strategy whereby one or more discontinuous transmission (DTX) bits input to the mapper result in unambiguous determination of output values from an Inphase (I) output and a Quadrature (Q) output of the mapper. As used herein, the "mapping means" or "mapper" can refer either to the transmitter 34A of FIG. 4A or the transmitter 34B of FIG. 4B and its constituent QAM 50 in particular. When reference is made to "transmitter" or "transmitter 34", it should be understood that either transmitter 34A or transmitter 34B can be referenced and both encompassed by such reference. As described below, the predetermined strategy can take various embodiments and modes. Each of the predetermined strategies define baseband processing rules (acts) to handle DTX bits in the case of 16QAM signal point constellation. Each of the predetermined strategies presumes that that the mapper has received Inphase (I) input bits and Quadrature (Q) input bits. It will be understood that the transmitter 34A of FIG. 4A and the QAM 50 of the transmitter 34B of FIG. 4B each comprise means for performing the acts described with respect to each predetermined strategy. Such means can be, in at least one example implementation, computer-implemented means including a computer or processor or the like as those terms are expansively defined herein.

Figure 6:
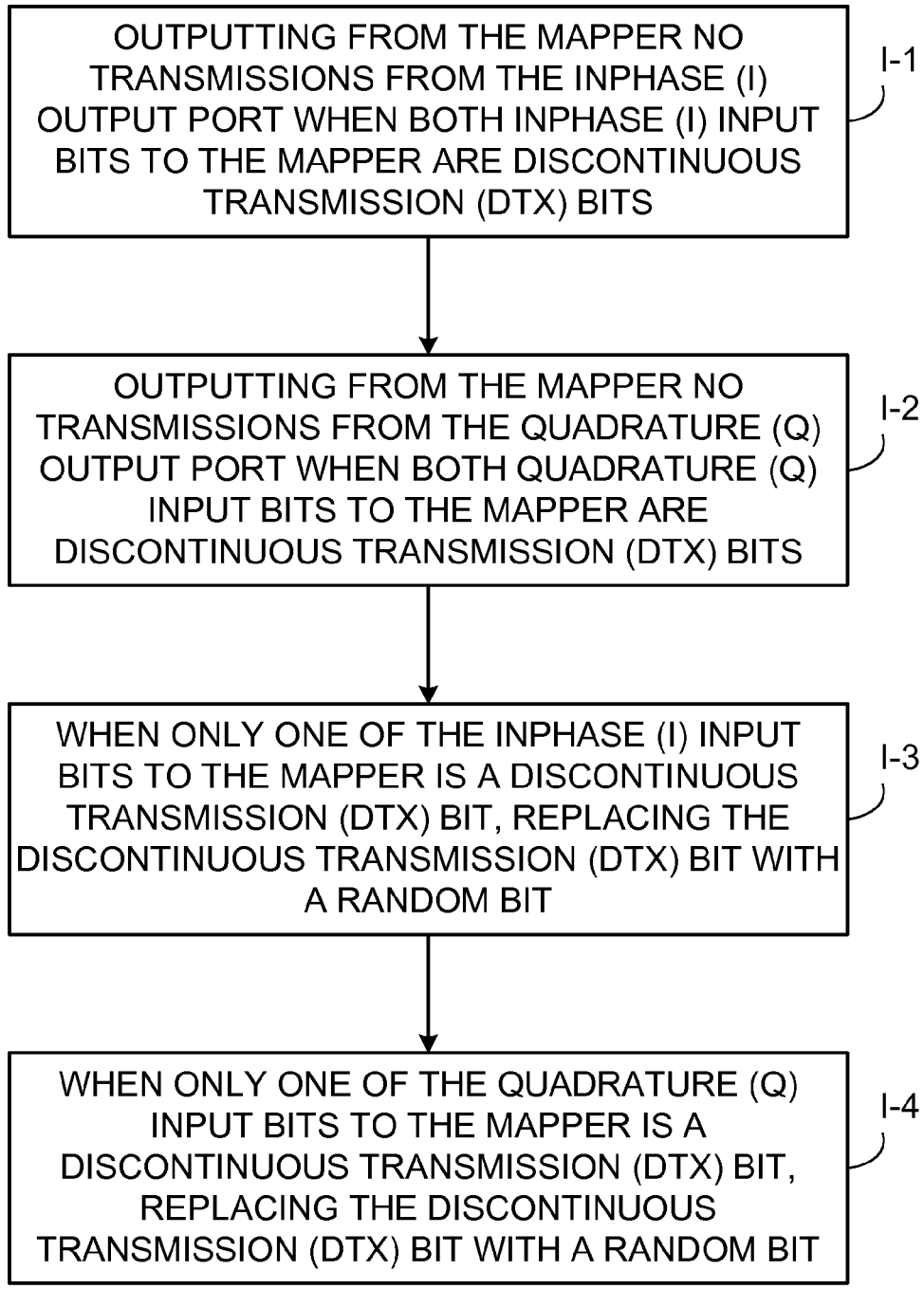
FIG. 6 is a flowchart illustrating basic, representative acts or steps comprising a first example embodiment and mode of a predetermined strategy of operating a mapper of a transmission formatter.

FIG. 6 illustrates representative acts or steps comprising a first example embodiment and mode of a predetermined strategy of operating the transmitter 34A of FIG. 4A and, in the case of FIG. 4B and FIG. 5, the QAM 50 which comprises transmitter 34B. The first example embodiment and mode of the predetermined strategy comprises acts depicted in FIG. 6 as act (I-1)-act (I-4). Act (I-1) comprises outputting from the mapper no transmissions from the Inphase (I) output when both Inphase (I) input bits to the mapper are discontinuous transmission (DTX) bits. Act (I-2) comprises outputting from the mapper no transmissions from the Quadrature (Q) output when both Quadrature (Q) input bits to the mapper are discontinuous transmission (DTX) bits. Thus, taken together, as a result of act (I-1) and act (I-2) there is no transmission on the I branch when both I branch bits ($i_1$, $i_2$) are DTX bits and no transmission on the Q branch when both Q branch bits ($q_1$,$q_2$) are DTX bits.

Act (I-3) comprises, when only one of the Inphase (I) input bits to the mapper is a discontinuous transmission (DTX) bit, replacing the discontinuous transmission (DTX) bit with a random bit. That is, for act (I-3) the mapper replaces a single DTX bit in the I branch bits ($i_1$, $i_2$) with a random dummy bit.

Act (I-4) comprises, when only one of the Quadrature (Q) input bits to the mapper is a discontinuous transmission (DTX) bit, replacing the discontinuous transmission (DTX) bit with a random bit. That is, for act (I-4) the QAM 50 replaces a single DTX bit in the Q branch bits ($q_1,q_2$), with a random dummy bit.

Concerning act (I-3) and act (I-4), or any other acts herein involving random bit(s), any pseudo random bit generator providing the values 0 and 1 with approximately equal probability could be used to generate the random dummy bit. Pseudo random generation is herein indirectly required to ensure that all base stations, participating in the MB SFN operations, use the same randomization mechanism to assure fully SFN operations. Preferably the random dummy bit is selected to maintain unbiased average power of a 16 QAM signal point constellation of the mapper. In other words, all signal constellation points should occur with the same probability, in which case the ensemble mean of the 16QAM symbols would be zero.

Figure 7:
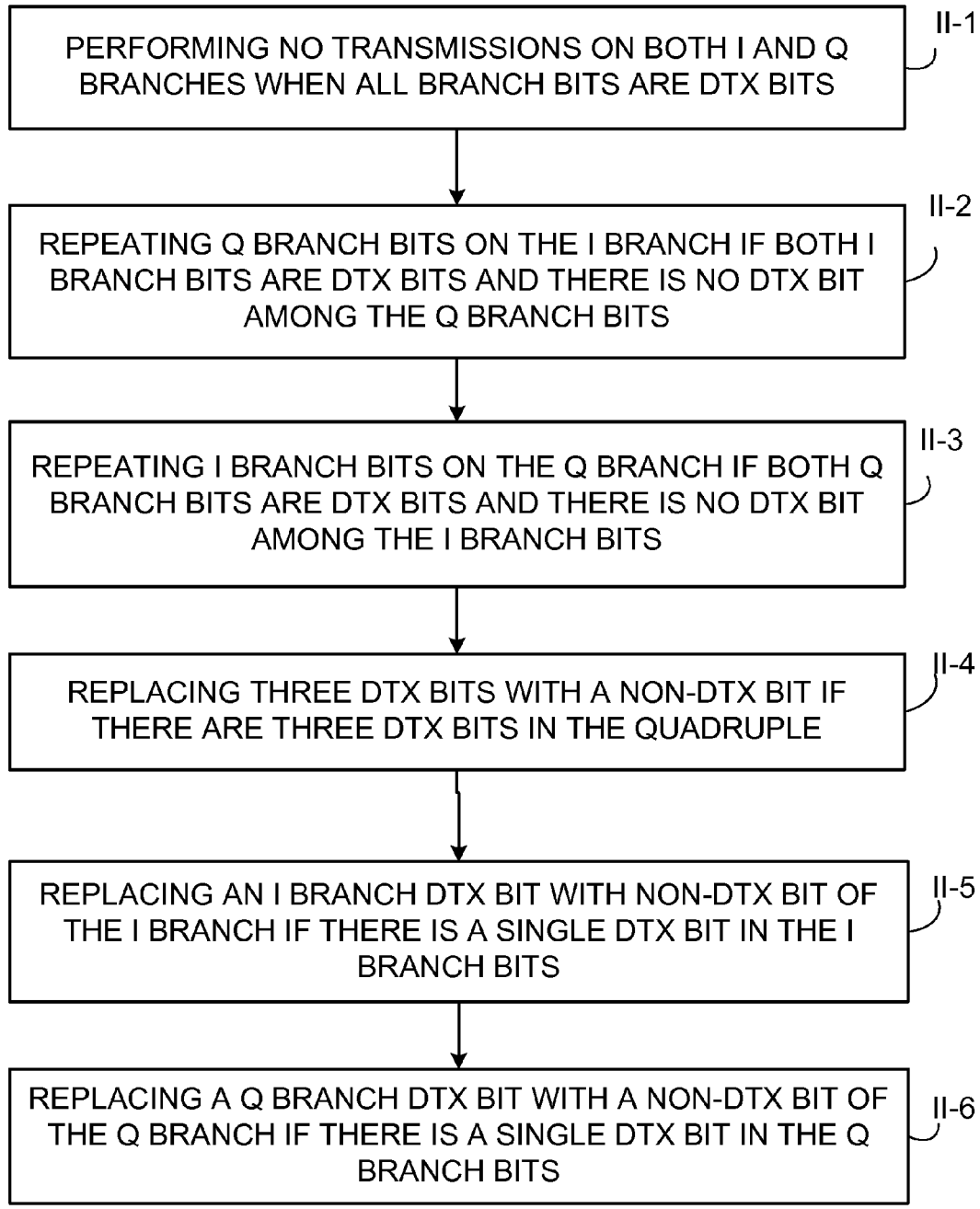
FIG. 7 is a flowchart illustrating basic, representative acts or steps comprising a second example embodiment and mode of a predetermined strategy of operating a mapper of a transmission formatter.

FIG. 7 illustrates basic, representative acts or steps comprising a second example embodiment and mode of a predetermined strategy of operating a mapper, e.g., a transmitter 34A of FIG. 4A or transmitter 34B of FIG. 4B. The second example embodiment and mode comprises acts (II-1) through (II-6). Act (II-1) comprises performing no transmissions on both I and Q branches when all branch bits ($i_1$, $i_2$, $q_1$, $q_2$) are DTX bits. That is, act (II-1) results in outputting from the mapper no transmissions from the Inphase (I) and Quadrature (Q) output when both Inphase (I) input bits $i_1$ and $i_2$ to the mapper and both Quadrature (Q) input bits $q_1$ and $q_2$ to the mapper are discontinuous transmission (DTX) bits.

Act (II-2) comprises repeating Q branch bits on the I branch, i.e. setting: $i_1=q_1$ and $i_2=q_2$ or setting: $i_1=q_2$ and $i_2=q_1$, if both I branch bits ($i_1$, $i_2$) are DTX bits and there is no DTX bit among the Q branch bits ($q_1,q_2$). That is, act (II-2) involves, when both of the Inphase (I) input bits $i_1$ and $i_2$ to the mapper are discontinuous transmission (DTX) bits and neither of the Quadrature (Q) input bits are discontinuous transmission (DTX) bits, replacing the first and second input Inphase (I) discontinuous transmission (DTX) bits $i_1$ and $i_2$ with the respective first and second Quadrature (Q) input bits.

Act (II-3) comprises repeating I branch bits on the Q branch, i.e. setting: $q_1=i_1$ and $q_2=i_2$ or setting $q_1=i_2$ and $q_2=i_1$, if both Q branch bits ($q_1$, $q_2$) are DTX bits and there is no DTX bit among the I branch bits ($i_1,i_2$). That is, act (II-3) comprises, when both of the Quadrature (Q) input bits $q_1$ and $q_2$ to the mapper are discontinuous transmission (DTX) bits and neither of the Inphase (I) input bits i1 and i2 are discontinuous transmission (DTX) bits, replacing first and second input Quadrature (Q) discontinuous transmission (DTX) bits $q_1$ and $q_2$ with respective first and second Inphase (I) input bits $i_1$ and $i_2$.

Act (II-4) comprises replacing three DTX bits with a non-DTX bit if there are three DTX bits in the quadruple ($i_1,q_1, i_2,q_2$). That is, act (II-4) comprises, when there are three discontinuous transmission (DTX) bits and a non-discontinuous transmission (DTX) bit in a quadruple of input bits input to the mapper, replacing the three discontinuous transmission (DTX) bits with the non-discontinuous transmission (DTX) bit.

Act (II-5) comprises replacing an I branch DTX bit with non-DTX bit of the I branch if there is a single DTX bit in the I branch bits ($i_1$, $i_2$). That is, act (II-5) comprises, when only one of the Inphase (I) input bits to the mapper is a discontinuous transmission (DTX) bit, replacing the discontinuous transmission (DTX) bit with a paired non-discontinuous transmission (DTX) Inphase (I) input bit.

Act (II-6) comprises replacing a Q branch DTX bit with a non-DTX bit of the Q branch if there is a single DTX bit in the Q branch bits ($q_1,q_2$). That is, act (II-6) comprises, when only one of the Quadrature (Q) input bits to the mapper is a discontinuous transmission (DTX) bit, replacing the discontinuous transmission (DTX) bit with a paired non-discontinuous transmission (DTX) Quadrature (Q) input bit.

Figure 8:
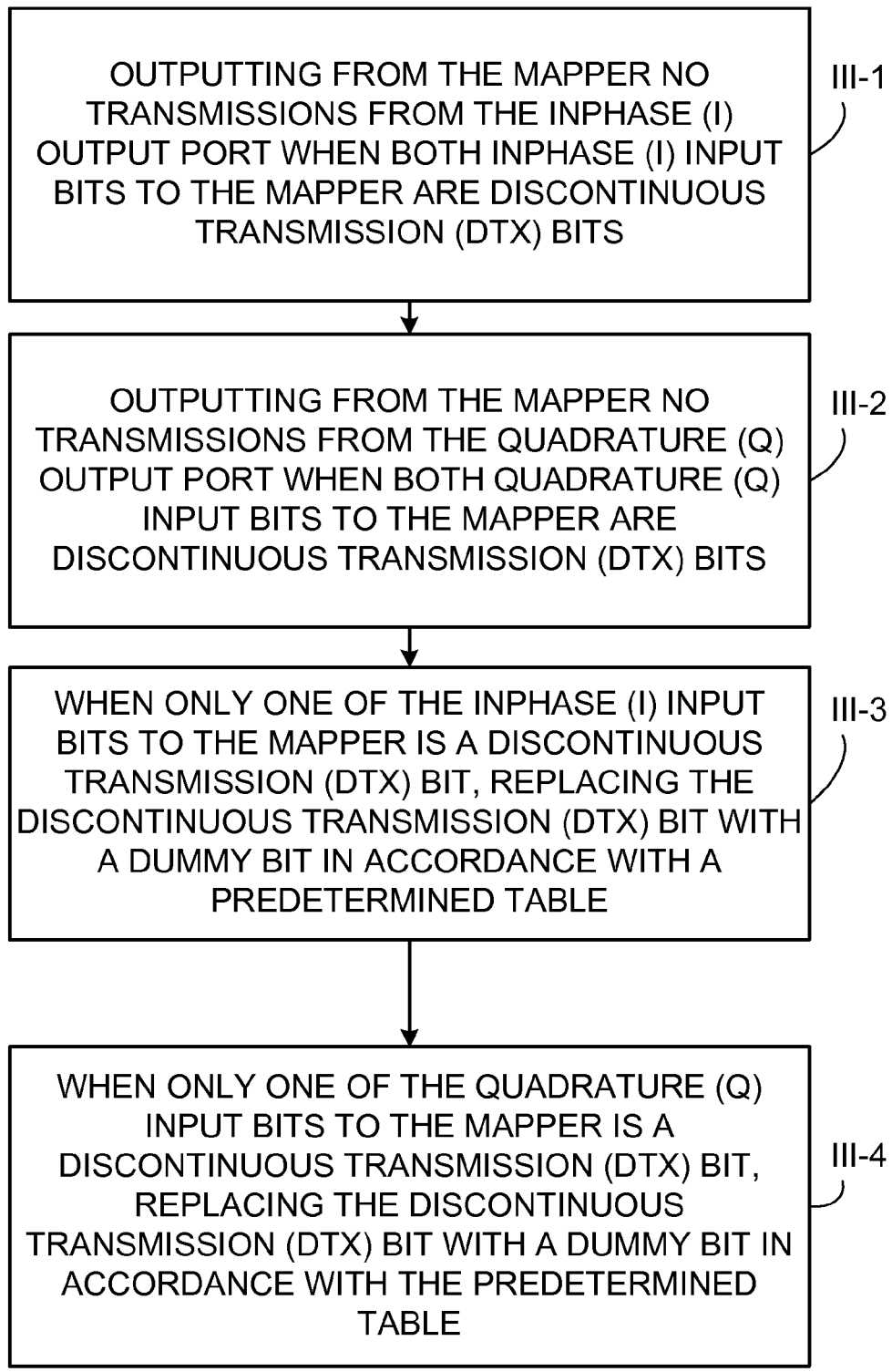
FIG. 8 is a flowchart illustrating basic, representative acts or steps comprising a third example embodiment and mode of a predetermined strategy of operating a mapper of a transmission formatter.

FIG. 8 illustrates basic, representative acts or steps comprising a third example embodiment and mode of a predetermined strategy of operating a mapper, e.g., a transmitter 34A of FIG. 4a or transmitter 34B of FIG. 4B. As in other embodiments, in the third example embodiment and mode the 16 Quadrature Amplitude Modulation (QAM) mapper is configured to employ a 16 QAM signal point constellation of symbols, each symbol of the constellation having one amplitude from a set of amplitudes {A2, A 1, −A1, −A2}.

The third example embodiment and mode comprises acts (III-1) through (III-4). Act (III-1) comprises outputting from the mapper no transmissions from the Inphase (I) output when both Inphase (I) input bits to the mapper are discontinuous transmission (DTX) bits. Act (III-2) comprises outputting from the mapper no transmissions from the Quadrature (Q) output when both Quadrature (Q) input bits to the mapper are discontinuous transmission (DTX) bits. Thus, taken together, as a result of act (III-1) and act (IIII-2) there is no transmission on the I branch when both I branch bits ($i_1$, $i_2$) are DTX bits and no transmission on the Q branch when both Q branch bits ($q_1,q_2$) are DTX bits.

Act (III-3) comprises, when only one of the Inphase (I) input bits to the mapper is a discontinuous transmission (DTX) bit, replacing the discontinuous transmission (DTX) bit with a dummy bit in accordance with Table 2. That is, if there is a single DTX bit in the I branch bits ($i_1$, $i_2$), the I branch DTX bit is replaced with a dummy bit in accordance with Table 2.

Act (III-4) comprises, when only one of the Quadrature (Q) input bits to the mapper is a discontinuous transmission (DTX) bit, replacing the discontinuous transmission (DTX) bit with a dummy bit in accordance with Table 2. That is, if there is a single DTX bit in the Q branch bits ($q_1$, $q_2$), the Q branch DTX is replaced with a dummy bit in accordance with Table 2.

TABLE 1

Mapping of single DTX bit in a quadruple of four bits

| Position of DTX bit x within ($i_1$, $i_2$) or ($q_1$, $q_2$) | Dummy bit for DTX bit x | Corresponding amplitude (See FIG. 3) |
| --- | --- | --- |
| (0, x) | x = 1 | $A_2$ |
| (x, 0) | x = 0 | $A_1$ |
| (1, x) | x = 0 | $-A_1$ |
| (x, 1) | x = 1 | $-A_2$ |

FIG. 9 illustrates basic, representative acts or steps comprising a fourth example embodiment and mode of a predetermined strategy of operating a mapper, e.g., a transmitter 34A of FIG. 4A or transmitter 34B of FIG. 4B. The fourth example embodiment and mode comprises acts (IV-1) through (IV-2). Act (IV-1) comprises outputting from the mapper no transmissions from Inphase (I) output and no transmissions from Quadrature (Q) output when both Inphase (I) input bits and both Quadrature (Q) input bits to the mapper are discontinuous transmission (DTX) bits. That is, there are no transmissions on both I and Q branches when all branch bits ($i_1$, $i_2$, $q_1$, $q_2$) are DTX bits.

Act (IV-2) comprises, when at least one but not all of a quadruple of input bits to the matter is/are discontinuous transmission (DTX) bit(s), replacing the discontinuous transmission (DTX) bit(s) with random dummy bit(s). That is, in all other cases, DTX bits are replaced by random dummy bits.

FIG. 10 illustrates basic, representative acts or steps comprising a fifth example embodiment and mode of a predetermined strategy of operating a mapper, e.g., a transmitter 34A of FIG. 4A or transmitter 34B of FIG. 4B. The fifth example embodiment and mode comprises act (V-1), i.e., replacing all input bits of a quadruple that is/are discontinuous transmission (DTX) bit(s) with random dummy bit(s) as input bit(s) to the mapper. In other words, in the fifth embodiment DTX bits are always replaced by random dummy bits.

For the first, fourth, and fifth example embodiments and modes the random dummy bit(s) are selected in coordination with other radio base station nodes also participating in the Multimedia Broadcast Multicast Service over Single Frequency Network (MBSFN) transmission.

Each of the first, fourth, and fifth example embodiments and modes described herein involve use/selection of random dummy bits. FIG. 11 illustrates two possible factors (e.g., constrains and/or criteria) which, in various example implementations, can influence selection of the random dummy bits. Factor 11-1 comprises the random dummy bit(s) preferably being selected to maintain unbiased average power of a 16 QAM signal point constellation of the mapper. Factor 11-2 comprises the random dummy bit(s) preferably being selected in coordination with other radio base station nodes also participating in the Multimedia Broadcast Multicast Service over Single Frequency Network (MBSFN) transmission. In other words, in embodiments including random dummy bits, random dummy bits shall be generated in the same way by all NodeBs participating in the MBSFN system. To the extent implemented, factor 11-1 and factor 11-2 may be implemented either individually or in combination.

Any one or more of the predetermined strategies depicted herein can, at least in some example contexts, be computer-implemented by computer execution of coded instructions stored on tangible computer-readable media.

The technology disclosed herein provides a way for WCDMA FACH baseband processing in MBSFN systems, such as MBSFN FDD and MBSFN IMB, to handle DTX insertion of bits when mapped to 16QAM signal point constellation. Given that data bits and DTX bit positions occur randomly and uncorrelated over time within the bit quadruple $(i_1, q_1, i_2, q_2)$, the mapping rules of the predetermined strategies described herein provide an unbiased signal point constellation. This means that accurate demodulation of the data can be done by terminals without a need to estimate and compensate for a potential bias in the signal point constellation.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be unduly limited. Reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly encompassed hereby. Moreover, it is not necessary for a device or method to address each and every problem sought to be solved by the present invention, for it to be encompassed by the present invention.

The invention claimed is:

1. A baseband processing method in a transmitter for handling discontinuous transmission indication bits (DTX bits) when transmitting using a 16 QAM signal point constellation mapped on an I-branch and a Q-branch wherein, for a quadruple of bits comprising two I-branch bits, i1 and i2, and two Q-branch bits q1 and q2, the method comprising:
   (1) performing no transmissions on both I and Q branches when both I-branch bits i1 and i2 and both Q-branch bits q1 and q2 are DTX bits;
   (2) if both I-branch bits i1 and i2 are DTX bits and there is no DTX bit among the Q-branch bits q1 and q2, then repeating the Q-branch bits on the I-branch;
   (3) if both Q-branch bits q1 and q2 are DTX bits and there is no DTX bit among the I-branch bits i1 and i2, then repeating the I-branch bits on the Q-branch;
   (4) if there are three DTX bits and a non-DTX bit in the quadruple of bits, replacing the three DTX bits with the non-DTX bit;
   (5) if there is a single DTX-bit in the I-branch bits, replacing the I-branch DTX-bit with the non-DTX bit of the I-branch;
   (6) if there is a single DTX-bit in the Q-branch bits, replacing the Q-branch DTX-bit with the non-DTX bit of the Q-branch.

2. The method of claim 1, further comprising performing acts (1) through (6) when handling DTX bits on a Secondary Common Control Physical Channel (S-CCPCH) for a Multimedia Broadcast Multicast Service over Single Frequency Network (MBSFN) transmission.

3. A transmitter (34) configured to handle discontinuous transmission indication bits, DTX bits, when transmitting using a 16 QAM signal point constellation mapped on an I-Branch and a Q-branch, the transmitter comprising a baseband processor adapted, for a quadruple of bits comprising two I-branch bits, i1 and i2, and two Q-branch bits q1 and q2, the processor being adapted to perform acts comprising:
   performing no transmissions on both I and Q branches when both I-branch bits i1 and i2 and both Q-branch bits q1 and q2 are DTX bits;
   repeating the Q-branch bits on the I-branch if both I-branch bits i1 and i2 are DTX bits and there is no DTX bit among the Q-branch bits q1 and q2;
   repeating the I-branch bits on the Q-branch if both Q-branch bits q1 and q2 are DTX bits and there is no DTX bit among the I-branch bits i1 and i2;
   replacing the three DTX bits with the non-DTX bit if there are three DTX bits and a non-DTX bit in the quadruple of bits;
   replacing the I-branch DTX-bit with the non-DTX bit of the I-branch; if there is a single DTX-bit in the I-branch bits; and
   replacing the Q-branch DTX-bit with the non-DTX bit of the Q-branch if there is a single DTX-bit in the Q-branch bits.

4. The transmitter of claim 3, wherein the transmitter is configured to handle the DTX bits on a Secondary Common Control Physical Channel (S-CCPCH) for a Multimedia Broadcast Multicast Service over Single Frequency Network (MBSFN) transmission.

5. A radio base station node comprising a transmitter according to claim 3.

* * * * *

UNITED STATES PATENT AND TRADEMARK OFFICE
CERTIFICATE OF CORRECTION

PATENT NO. : 8,730,888 B2  Page 1 of 1
APPLICATION NO. : 13/124912
DATED : May 20, 2014
INVENTOR(S) : Gerstenberger et al.

It is certified that error appears in the above-identified patent and that said Letters Patent is hereby corrected as shown below:

On the Title Page, Item (56), under "OTHER PUBLICATIONS", in Column 2, Line 10, delete "Broadcase"," and insert -- Broadcast", --, therefor.

In the Specification

In Column 11, Line 10, delete "MB SFN" and insert -- MBSFN --, therefor.

In the Claims

In Column 14, Line 33, in Claim 3, delete "transmitter (34)" and insert -- transmitter --, therefor.

Signed and Sealed this
Fourth Day of November, 2014

Michelle K. Lee
*Deputy Director of the United States Patent and Trademark Office*